(12) United States Patent
Ishikura et al.

(10) Patent No.: US 9,213,509 B2
(45) Date of Patent: Dec. 15, 2015

(54) ELECTRIC EQUIPMENT

(71) Applicant: Sharp Kabushiki Kaisha, Osaka (JP)

(72) Inventors: Kaoru Ishikura, Osaka (JP); Shuhji Fujii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/390,941

(22) PCT Filed: Apr. 11, 2013

(86) PCT No.: PCT/JP2013/060880
§ 371 (c)(1),
(2) Date: Oct. 6, 2014

(87) PCT Pub. No.: WO2013/154143
PCT Pub. Date: Oct. 17, 2013

(65) Prior Publication Data
US 2015/0062624 A1 Mar. 5, 2015

(30) Foreign Application Priority Data

Apr. 12, 2012 (JP) ................................ 2012-091332

(51) Int. Cl.
| | |
|---|---|
| *H04N 1/00* | (2006.01) |
| *G06F 3/12* | (2006.01) |
| *G06F 3/048* | (2013.01) |
| *G03G 15/00* | (2006.01) |
| *B41J 29/38* | (2006.01) |
| *B41J 29/42* | (2006.01) |
| *G03G 21/00* | (2006.01) |
| *G06F 3/0482* | (2013.01) |

(52) U.S. Cl.
CPC ............... *G06F 3/1253* (2013.01); *B41J 29/38* (2013.01); *B41J 29/42* (2013.01); *G03G 15/502* (2013.01); *G03G 21/00* (2013.01); *G06F 3/048* (2013.01); *G06F 3/0482* (2013.01); *G06F 3/1204* (2013.01)

(58) Field of Classification Search
None
See application file for complete search history.

(56) References Cited

U.S. PATENT DOCUMENTS

| | | | |
|---|---|---|---|
| 6,906,826 B1 * | 6/2005 | Kuwata et al. ................. | 358/1.9 |
| 7,595,792 B2 * | 9/2009 | Rieger et al. ................. | 345/184 |
| 2002/0126322 A1 * | 9/2002 | Kadowaki ..................... | 358/440 |
| 2004/0145765 A1 | 7/2004 | Machida et al. | |
| 2004/0233316 A1 * | 11/2004 | Battles et al. ............ | 348/333.02 |
| 2004/0262378 A1 * | 12/2004 | Ooki ............................. | 235/375 |

(Continued)

FOREIGN PATENT DOCUMENTS

| | | |
|---|---|---|
| JP | 2004-226911 A | 8/2004 |
| JP | 2006-069738 A | 3/2006 |

OTHER PUBLICATIONS

International Search Report for corresponding International Application No. PCT/JP2013/060880 mailed May 21, 2013.

*Primary Examiner* — Beniyam Menberu (74) *Attorney, Agent, or Firm* — Renner, Otto, Boisselle & Sklar, LLP (57) ABSTRACT

To provide an electric equipment which has a function in which parameter is set, and enables a user to appropriately adjust the parameters regardless of an ability level of user. A plurality of reception screens having different degrees of detail for received instructions for adjusting parameters are displayed depending on the ability level of user to adjust the appropriate parameters, such as maintenance ability, or presence or absence of the specialized knowledge for the apparatus, or the like, thus the user adjusts the parameter using the reception screen suitable for the user.

3 Claims, 8 Drawing Sheets (56) References Cited

U.S. PATENT DOCUMENTS

| | | |
|---|---|---|
| 2005/0213127 A1* | 9/2005 | Hoshino ........................ 358/1.9 |
| 2007/0136293 A1* | 6/2007 | Mizumukai ...................... 707/9 |
| 2010/0020027 A1* | 1/2010 | Park et al. .................... 345/173 |
| 2010/0188701 A1 | 7/2010 | Machida et al. |
| 2010/0229109 A1* | 9/2010 | Miwa ........................... 715/760 |
| 2011/0235129 A1* | 9/2011 | Ohkawa ........................ 358/406 |
| 2012/0030622 A1* | 2/2012 | Hasegawa ..................... 715/811 |
| 2012/0062928 A1* | 3/2012 | Tsubouchi ................... 358/1.14 |
| 2012/0287258 A1* | 11/2012 | Tsuneta et al. .................. 348/80 |
| 2013/0096702 A1* | 4/2013 | Sorokin et al. ................. 700/83 |

* cited by examiner

PLAIN PAPER SYSTEM／COLOR PLAIN PAPER

|  | TH-UM | TH-LM1 | TH-US1 |
|---|---|---|---|
| HIGH | 180 | 100 | 180 |
| MIDDLE | 160 | 90 | 160 |
| LOW | 140 | 80 | 140 |

PLAIN PAPER SYSTEM／MONOCHROME PLAIN PAPER

|  | TH-UM | TH-LM1 | TH-US1 |
|---|---|---|---|
| HIGH | 160 | 100 | 160 |
| MIDDLE | 150 | 90 | 150 |
| LOW | 140 | 80 | 140 |

ELECTRIC EQUIPMENT

This application is the national phase under 35 U.S.C. §371 of PCT International Application No. PCT/JP2013/60880 which has an International filing date of Apr. 11, 2013 and designated the United States of America.

BACKGROUND

1. Technical Field

The present invention relates to adjustment of parameter for an electric equipment in which a plurality of parameters are set in a function.

2. Description of Related Art

Recently, public facilities, convenience stores, or the like, are provided with an apparatus such as a printer or a multi-function peripheral and a user may pay a prescribed charge to use the apparatus.

However, at the time of the occurrence of trouble, adjusting performance of a prescribed function, or the like, a prescribed time for a service man to arrive on the spot is required, and therefore a manager (for example, store-owner) of the apparatus needs to perform some degree of temporary measures.

For example, Japanese Patent Laid-open Publication No. 2006-69738 discloses an image forming apparatus which detects a position shift in a direction orthogonal to a sheet feeding direction, and when an amount of the position shift exceeds a reference value, corrects the position shift, and enables the service man or a user to arbitrarily change the reference value.

SUMMARY

Meanwhile, since a plurality of parameters are often set in one function, the apparatus needs to adjust the plurality of parameters relating to the function so as to resolve a trouble, adjust the performance of the function or the like.

However, there is a great difference in maintenance ability, specialized knowledge, and the like between the service man and the store-owner, and even in similar service men, they have a difference in maintenance ability due to a difference in experience.

Therefore, the adjustment of the parameters may be affected by these individual differences.

That is, a skilled service man may adjust in detail the parameters according to a use situation of the apparatus, but an unskilled service man such as a store-owner may not adjust in detail the parameters.

In addition, a considerable number of operation screens provided to adjust the prescribed function (parameters) need a complicated and difficult operation and require specific maintenance ability, specialized knowledge, and the like to a certain degree or more. Therefore, the operation screen has poor operability and is difficult to operate appropriately, and therefore intensifies confusion for inexperienced persons such as an unskilled service man or a store-owner.

In consideration of the above-mentioned circumstances, it is an object of the present invention to provide an electric equipment having a function in which parameter is set, wherein a plurality of reception screens having different degrees of detail for received instructions for adjusting the parameter are displayed depending on an ability level of user to adjust the parameters, such as maintenance ability, presence or absence of specialized knowledge for the apparatus, or the like, and thereby the user may appropriately adjust the parameters regardless of his level of ability.

According to the present invention, there is provided an electric equipment having a function in which parameter is set, including: a display unit configured to display a plurality of reception screens having different degrees of detail for received instructions for adjusting the parameter.

According to the present invention, the reception screens having the different degrees of detail for received instructions for adjusting the parameter depending on the ability level of user who adjusts the parameter such as the maintenance ability, the presence or absence of specialized knowledge for the apparatus, or the like are displayed on the display unit, thus the user adjusts the parameter of the function through the reception screen suitable for his own ability.

In the electric equipment according to the present invention, the plurality of reception screens receive input of parameter values at the time of receiving the instruction, and includes: a large gap input reception screen configured to receive an input of values having an interval equal to or more than a threshold value; and a small gap input reception screen configured to receive an input of values having an interval narrower than the threshold value.

According to the present invention, the large gap input reception screen may receive the input of the values having the interval equal to or more than the threshold value at the time of receiving the input of the parameter values, and the small gap input reception screen may receive the input of the values having the interval narrower than the threshold value.

The electric equipment according to the present invention may include a number reception section configured to receive an input of number, wherein the small gap input reception screen may receive the input of the value through the number reception section, the large gap input reception screen may include an instruction reception section configured to receive an instruction for displaying the values having the interval equal to or more than the threshold value in an ascending order or a descending order, and may receive the input of the value based on the value displayed according to the instruction received by the instruction reception section.

According to the present invention, the number reception section receives the input of the number from the user, and the small gap input reception screen receives the input of the value based on the number received by the number reception section. When a prescribed value is displayed on the display unit according to the instruction received by the instruction reception section from the user, the large gap input reception screen receive the input of the value, based on the displayed value.

The electric equipment according to the present invention may include a storage unit configured to store a plurality of values having a prescribed interval, wherein the large gap input reception screen may include selection reception section configured to receive a selection from a user corresponding to each of the plurality of values, and when any one of the selection reception section is selected, may adjust the parameter based on a value corresponding to the selected selection reception section According to the present invention, the large gap input reception screen includes the selection reception section corresponding to each of the plurality of values stored in the storage unit, and when any one of the selection reception section are selected by the user, the value corresponding to the selected selection reception section is read from the storage unit and the parameter is adjusted based on the read value.

The electric equipment according to the present invention may include a reception section configured to receive user identification data, wherein the display unit may display any one of the reception screens based on the user identification data received by the reception section.

According to the present invention, when the reception section receives the user identification data, the display unit displays the large gap input reception screen or the small gap input reception screen based on the user identification data received by the reception section.

According to the present invention, the plurality of reception screens having the different degrees of detail for received instructions for adjusting the parameter are displayed depending on the ability level of user to adjust the parameter, such as the maintenance ability, the presence or absence of specialized knowledge for the apparatus, or the like, the user may appropriately adjust the parameters regardless of his ability level.

The above and further objects and features will move fully be apparent from the following detailed description with accompanying drawings.

DETAILED DESCRIPTION

Recently, since a function of electric equipment often has a plurality of parameters set therein, there is a need to adjust the plurality of parameters relating to the function so as to adjust the function.

For example, according to a multi-function peripheral, in a fixing function using a fixing roller and a pressing roller and fixing a non-fixed toner image on a recording paper passing through a fixing nip part between the rollers onto the recording paper, an example of parameters relating to a fixing temperature may include a temperature of heater lamps of the fixing roller and the pressing roller.

In more detail, two places (a central portion and both end portions) of the fixing roller are provided with the heater lamps and one place (the central portion) of the pressing roller is provided with the heater lamp. That is, the parameters in the fixing function include a temperature of the three heater lamps.

In addition, in order to adjust the fixing temperature, there is a need to adjust the three heater lamps of the fixing roller and the pressing roller. However, the adjustment is different depending on a kind of recording paper used (for example, plain paper, thick paper, OHP film, and the like), a size (for example, A4, A5, B4, B5, and the like) of the recording paper, a place direction (for example, longitudinal direction or short direction), and the like, but is also affected by use situations of the multi-function peripheral.

However, in order to operate an operation screen provided by the multi-function peripheral for adjustment of the parameters, maintenance ability, specialized knowledge, or the like to a certain degree or more may be often required. For this reason, since the operation screen has poor operability, unskilled persons such as an unskilled service man or a storeowner have difficulty to appropriately operate the operation screen. The present invention relates to the above problem.

Hereinafter, a case in which an electric equipment according to an embodiment of the present invention is applied to a multi-function peripheral will be described in detail, by way of example, with reference to the accompanying drawings. Hereinafter, for the convenience of explanation, as described above, a case of the temperature adjustment in the fixing function will be described by way of example. Further, hereinafter, in the fixing roller, a heater lamp at a central portion is referred to as a "TH-UM", heater lamps at the both end portions are referred to as a "TH-US1", and a heater lamp at a central portion of the pressing roller is referred to as a "TH-LM1".

Embodiment 1

Figure 1:
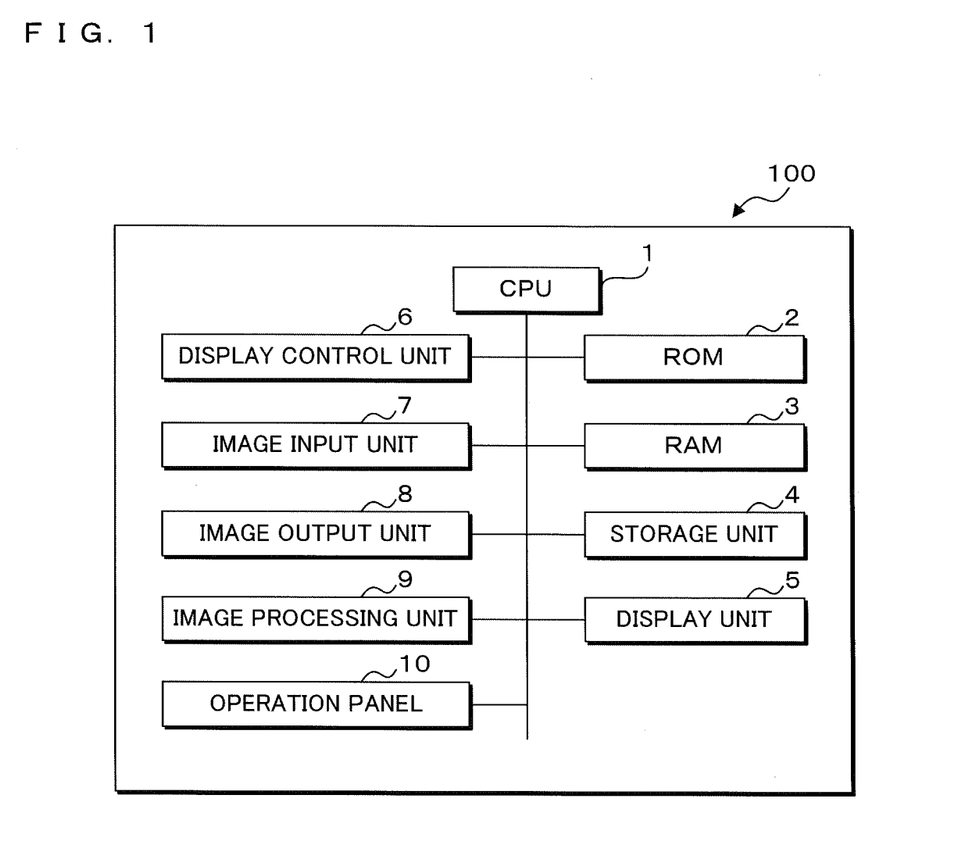
FIG. 1 is a functional block diagram illustrating a configuration of main components of a multi-function peripheral according to Embodiment 1 of the present invention.

FIG. 1 is a functional block diagram illustrating a configuration of main components of a multi-function peripheral 100 according to Embodiment 1 of the present invention. The multi-function peripheral 100 includes a CPU (reception section) 1, a ROM 2, a RAM 3, a storage unit 4, a display unit 5, a display control unit 6, an image input unit 7, an image output unit 8, an image processing unit 9, and an operation panel 10.

The ROM 2 is pre-stored with various control programs, basically fixed data among parameters for calculation, and the like, and the RAM 3 may temporarily store data and read the data irrespective of a storage order, a storage location and the like. Further, the RAM 3 stores, for example, programs read from the ROM 2, various data generated by running the programs, parameters appropriately changed at the time of running and the like.

The CPU 1 loads a control program pre-stored in the ROM 2 onto the RAM 3 and runs the control program to control various hardware units as described above, thereby operating whole of the apparatus as the multi-function peripheral 100 according to Embodiment 1 of the present invention.

The display control unit 6 includes a processor such as a digital signal processor (DSP) and controls an image to be displayed on the display unit 5. For example, the display control unit 6 displays an identification information reception screen for receiving user identification information or displays a simple operation screen and a detailed operation screen to be described below on the display unit 5 using image data stored in the storage unit 4, according to an instruction of the CPU 1.

The image input unit 7 includes a light source irradiating light to a manuscript for reading, an image sensor such as a charge coupled device (CCD), or the like, and optically reads image data of the manuscript. Further, the image input unit 7 forms an optical image reflected from the manuscript set at a prescribed read position on the image sensor to output analog data of red-green-blue (RGB).

The image output unit 8 prints an image on a recording medium such as recording paper, an OHP film, or the like based on the image data output from the image processing unit 9. The image output unit 8 includes a photosensitive drum, a charger for charging the photosensitive drum to a prescribed potential, a laser writing device which emits a laser beam depending on the image data received from an outside to generate an electrostatic latent image on the photosensitive drum, a developing device which supplies a toner to the electrostatic latent image formed on a surface of the photosensitive drum to develop the image, a transfer unit which transfers a toner image formed on the surface of the photosensitive drum onto the recording medium, a fixing roller which fixes the toner image onto the recording medium and the like.

The image processing unit 9 generates, for example, digital type image data based on the analog data input from the image input unit 7 or reads the image data stored in the storage unit 4, performs processing depending on each type of images, and then generates image data to be output (printed). The image data for outputting generated by the image processing unit 9 is output to the image output unit 8.

Further, in the multi-function peripheral 100, the operation panel 10 is provided with keys, such as functional buttons for switching functions such as "facsimile", "copy", "printing", "mail", and the like, a numeric key used to input value of each parameter, a start button, a cancel key, an enter key for fixing a received instruction, and an "output" key for image forming a image of the manuscript read through the image input unit 7 to the recording paper and the like.

The display unit 5 includes, for example, an LCD, an electroluminescence (EL) panel, or the like and displays an image to be output (printed) on the recording paper through the image output unit 8. Further, the display unit 5 displays information to be notified to the user, such as a state of the multi-function peripheral 100, a job processing situation, an image of a manuscript read by the image input unit 7, and a confirmation of an operation content of the operation panel 10 and the like.

Further, the display unit 5 displays a reception screen which receives an instruction relating to adjustment of parameters from a user at the time of adjusting the parameters of a prescribed function. In more detail, the simple operation screen (large gap input reception screen) or the detailed operation screen (small gap input reception screen) is displayed depending on an individual's ability such as maintenance ability, specialized knowledge, or the like of the user. The simple operation screen and the detailed operation screen have different degrees of detail for received instructions in adjustment of the parameters.

Figure 2:
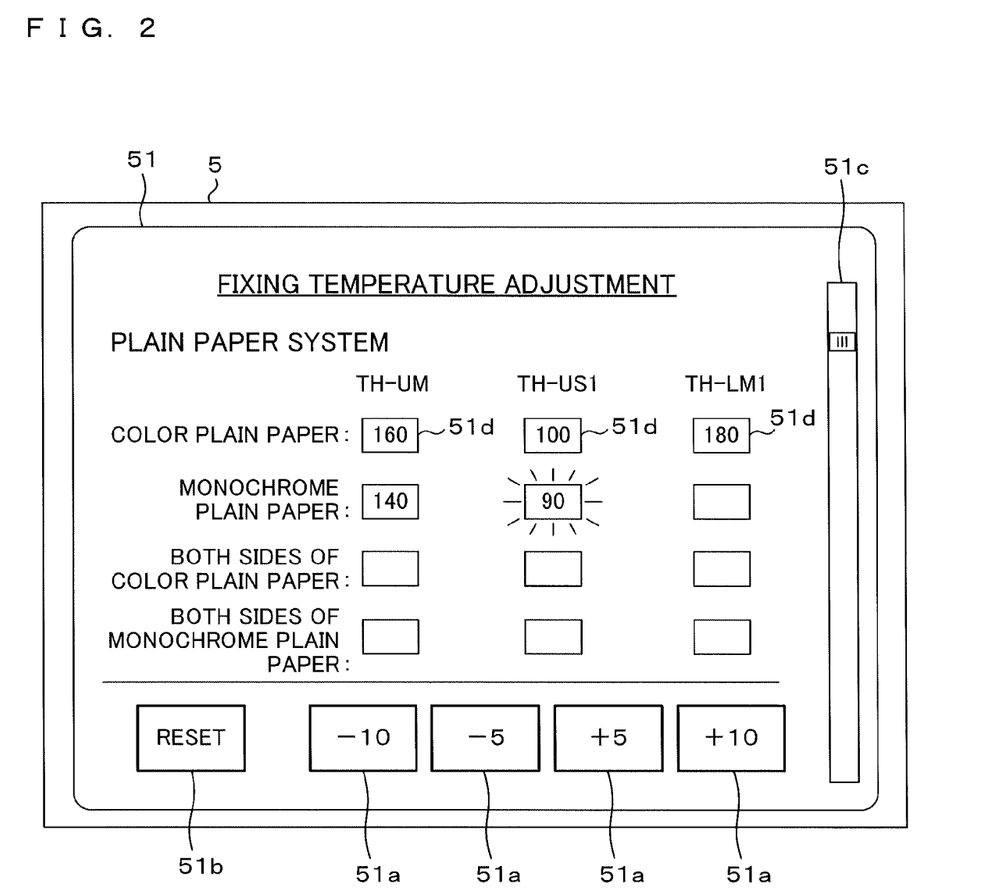
FIG. 2 is an exemplified view illustrating an example of a simple operation screen displayed on a display unit in the multi-function peripheral according to Embodiment 1 of the present invention.
Figure 3:
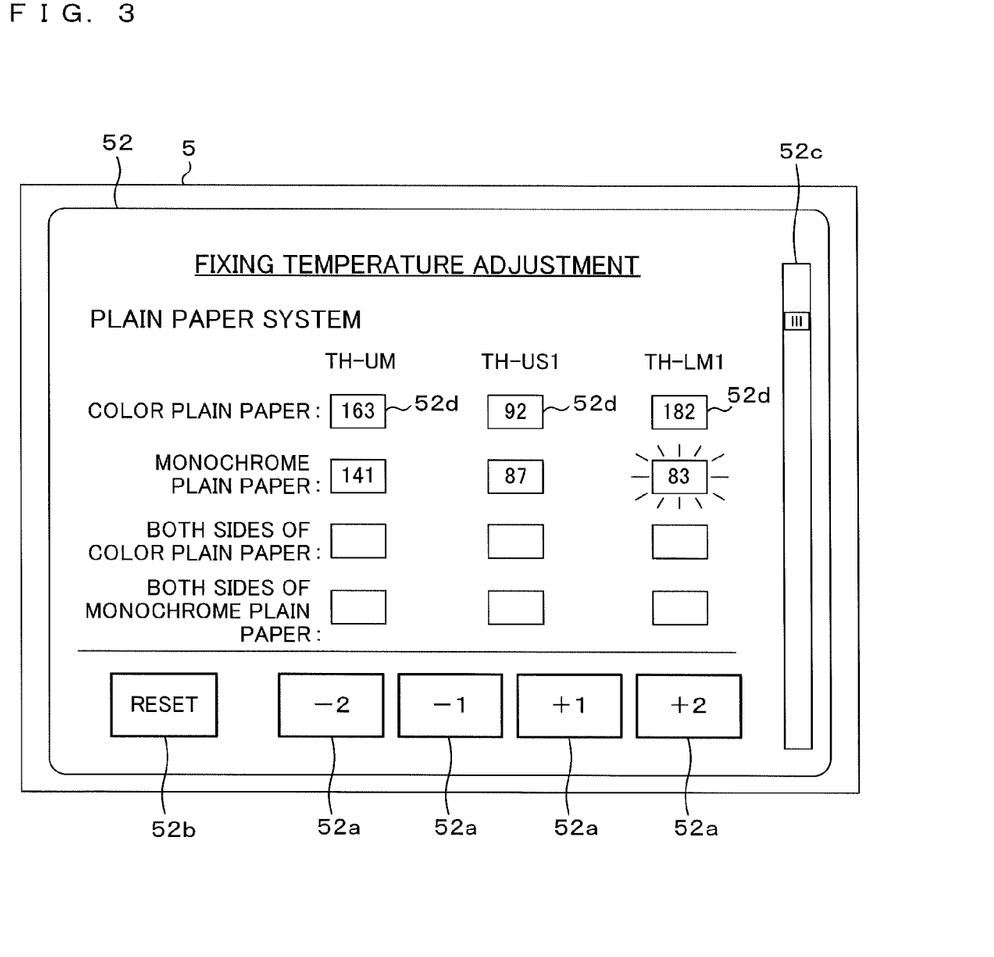
FIG. 3 is an exemplified view illustrating an example of a detailed operation screen displayed on the display unit in the multi-function peripheral according to Embodiment 1 of the present invention.

FIG. 2 is an exemplified view illustrating an example of the simple operation screen displayed on the display unit 5 in the multi-function peripheral 100 according to Embodiment 1 of the present invention, and FIG. 3 is an exemplified view illustrating an example of the detailed operation screen displayed on the display unit 5 in the multi-function peripheral 100 according to Embodiment 1 of the present invention.

The simple operation screen 51 receives an input of values having an interval equal to or more than a prescribed threshold value when there are a plurality of parameters relating to a prescribed function and it is needed to adjust the parameters at the time of adjusting the function. That is, only any one of the numbers (values) increasing or decreasing at an interval of the threshold value is received through the simple operation screen 51. Thereby, in adjusting the parameters, operability of unskilled persons who may not perform a detailed adjustment is enhanced.

In an example of the simple operation screen 51 as illustrated in FIG. 2, for the "TH-UM", the "TH-US1", and the "TH-LM1" in adjusting the fixing temperature, as described above, a case of receiving the input of the values having the interval equal to or more than the prescribed threshold value is illustrated.

In the simple operation screen 51, for example, a plain paper system is additionally divided into items of color plain paper, monochrome plain paper, both sides of the color plain paper, and both sides of the monochrome plain paper, and the simple operation screen 51 receives the values of the "TH-UM", the "TH-US1", and the "TH-LM1" for the items, respectively, from the user.

In detail, the simple operation screen 51 is provided with number increasing-decreasing keys 51a, 51a, . . . , for receiving an instruction to display values increased or decreased at an interval of "5" or "10", a reset key 51b for resetting the displayed values, a scroll bar 51c for moving to another page, and input frames 51d, 51d, . . . , in which the values (numbers) to be input are displayed. The user may select, for example, the input frame 51d of a prescribed item and appropriately operate any one of the number increasing-decreasing keys 51a to display a desired value in the input frame 51d. Thus the value maybe input.

The simple operation screen 51 is configured to be used by a person who has low maintenance ability and does not have specialized knowledge for the apparatus such as unskilled persons, for example, an unskilled service man or a storeowner. In the simple operation screen 51 illustrated in FIG. 2, since an operator need not perform the detailed operation, a confusion of the operator in adjustment of the parameters may be prevented so as to improve the operability.

Meanwhile, when the plurality of parameters relating to the function at the time of adjusting the prescribed function are present and there is a need to adjust the parameters, a detailed operation screen 52 illustrated in FIG. 3 receives values having an interval narrower than the threshold value relating to the simple operation screen 51 illustrated in FIG. 2. Thereby, at the time of adjusting the parameters, the detailed adjustment may be achieved.

In the example of the detailed operation screen 52 as illustrated in FIG. 3, in adjusting the fixing temperature, for the "TH-UM", the "TH-US1", and the "TH-LM1", the input of the more detailed values than the simple operation screen 51 is illustrated. As similar to the case of FIG. 2, the plain paper system is divided into items of color plain paper, monochrome plain paper, both sides of the color plain paper, and both sides of the monochrome plain paper.

In detail, the detailed operation screen 52 includes number increasing-decreasing keys 52a, 52a, . . . , for receiving an instruction to display values increased or decreased at an interval of "1" or "2", a reset key 52b for resetting the displayed values, a scroll bar 52c for moving to another page, and input frames 52d, 52d, . . . , in which the values (numbers) to be input are displayed. The user may select, for example, the input frame 52d of prescribed items and appropriately operate any one of the number increasing-decreasing keys 52a to display a desired value in the input frame 52d. Thus the value maybe input. Thereby, it is possible to input a more detailed value in the detailed operation screen 52 than the simple operation screen 51.

The detailed operation screen 52 may be configured to be used by a person having high maintenance abilities or specialized knowledge for the apparatus. In the detailed operation screen 52 illustrated in FIG. 3, an expert such as a skilled service man having extensive experience may adjust the parameters in detail making the most use of his own know-how.

The storage unit 4 includes, for example, a non-volatile storage medium such as a flash memory, an EEPROM, an HDD, a magneto-resistive memory (MRAM), a ferroelectric RAM (FeRAM), an OUM or the like.

Figure 4:
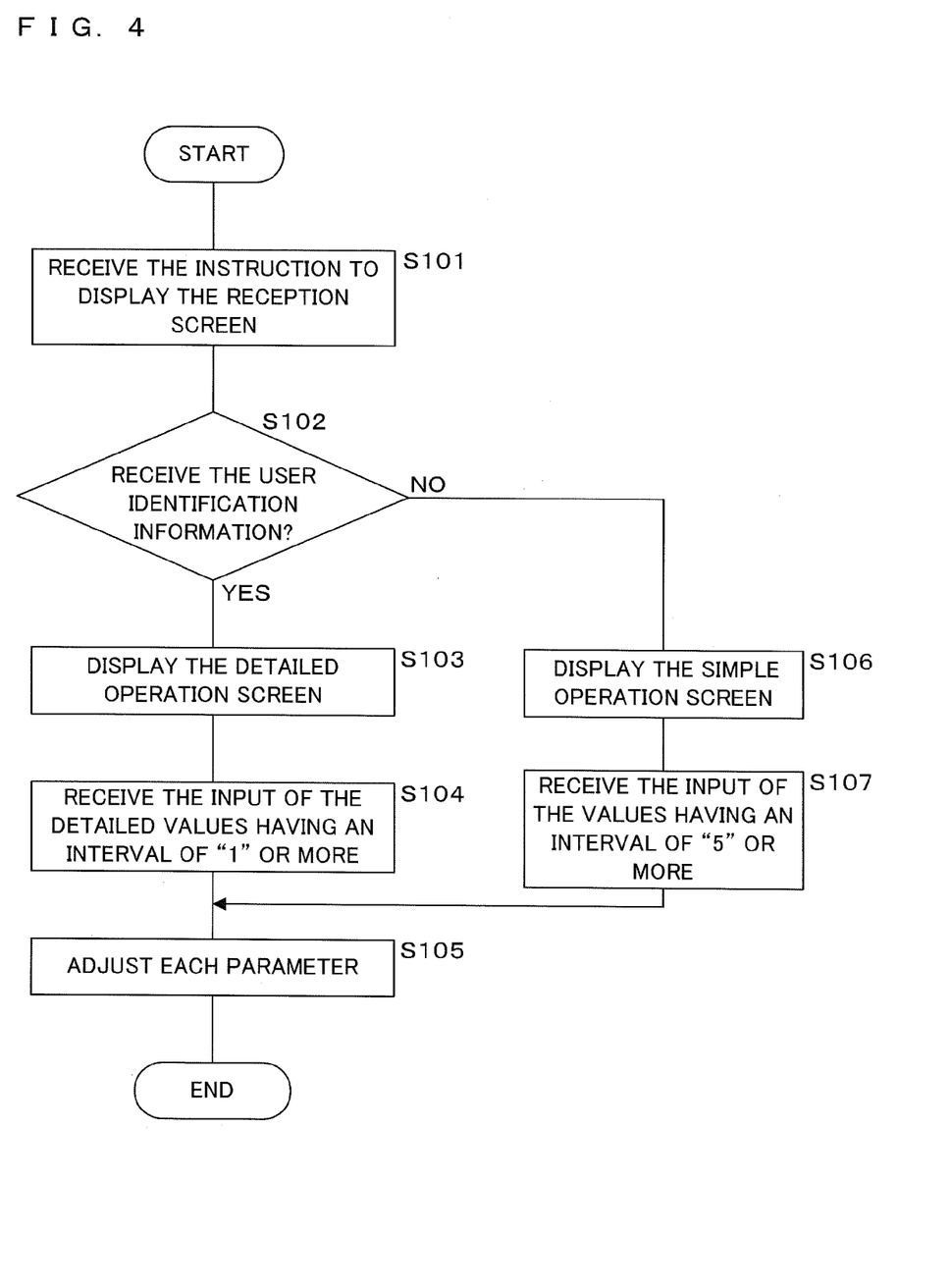
FIG. 4 is a flow chart describing a case of adjusting parameters using the simple operation screen or the detailed operation screen in the multi-function peripheral according to Embodiment 1 of the present invention.

FIG. 4 is a flow chart describing the case of adjusting the parameters using the simple operation screen 51 or the detailed operation screen 52 in the multi-function peripheral 100 according to Embodiment 1 of the present invention. For the convenience of explanation, the embodiment of the present invention will be described below with reference to FIGS. 2 and 3.

For example, when the user wants to adjust the fixing temperature in the fixing function, he/she appropriately operates the operation panel 10 and instructs to display the reception screen for the adjustment. Herein, the CPU 1 receives the instruction to display the reception screen through the operation panel 10 (step S101).

In this case, the CPU 1 instructs the display control unit 6 to display the reception screen for receiving the user identification information and the display control unit 6 displays the reception screen on the display unit 5. Herein, the user identification information needs to be allocated only to the skilled service man having the high maintenance abilities or specialized knowledge for the apparatus.

The CPU 1 monitors the operation panel 10 to determine whether it receives the user identification information (step S102).

For example, when the user is a service man allocated with the user identification information and inputs the user identification information by operating the operation panel 10, the CPU 1 determines that it receives the user identification information (YES in step S102) and instructs the display control unit 6 to display the detailed operation screen 52.

The display control unit 6 displays the detailed operation screen 52 illustrated in FIG. 3 on the display unit 5 according to the instruction of the CPU 1 (step S103).

In this case, the user selects an input frame 52*d* of prescribed items and appropriately operates any one of the number increasing-decreasing keys 52*a* to display the desired values in the input frame 52*d* by increasing or decreasing the values at an internal of "1" or "2". Thus the value is input.

The user repeatedly performs the foregoing operations on each item. Thereby, the CPU 1 receives the input of the detailed values having an interval of "1" or more for each parameter "TH-UM", "TH-US1", and "TH-LM1" of each item through the detailed operation screen 52 (step S104).

Next, the CPU 1 adjusts each parameter "TH-UM", "TH-US1", and "TH-LM1" based on the received values (step S105).

Meanwhile, when the user does not have the user identification information and may not input the user identification information, for example, when the user identification information is not input for a prescribed time, the CPU 1 determines that it does not receive the user identification information (NO in step S102) and instructs the display control unit 6 to display the simple operation screen 51.

The display control unit 6 displays the simple operation screen 51 as illustrated in FIG. 2 on the display unit 5 according to the instruction of the CPU 1 (step S106).

In this case, the user selects the input frame 51*d* of the prescribed items and appropriately operates any one of the number increasing-decreasing keys 51*a* to display the desired values in the input frame 51*d* by increasing or decreasing the values at an internal of "5" or "10". Thus the value is input.

The user repeatedly performs the foregoing operations on each item. Thereby, the CPU 1 receives the input of the values having an interval of "5" or more for each parameter "TH-UM", "TH-US1", and "TH-LM1" of each item through the simple operation screen 51 (step S107). Next, the processing proceeds to step S105.

Embodiment 2

Even in the multi-function peripheral 100 according to Embodiment 2 of the present invention, similar to Embodiment 1, in adjusting the parameters, the simple operation screen and the detailed operation screen having different degrees of detail for received instructions are displayed on the display unit 5.

Figure 5:
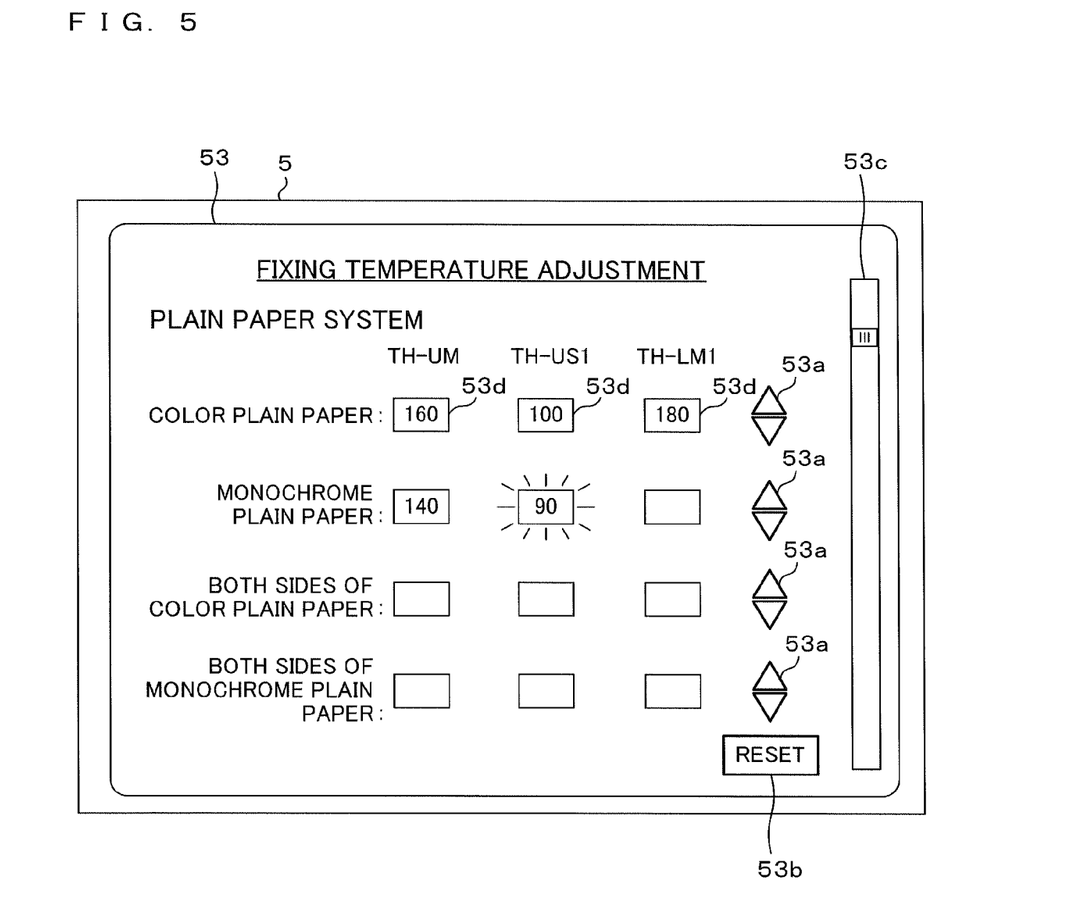
FIG. 5 is an exemplified view illustrating an example of a simple operation screen displayed on a display unit in a multi-function peripheral according to Embodiment 2 of the present invention.
Figure 6:
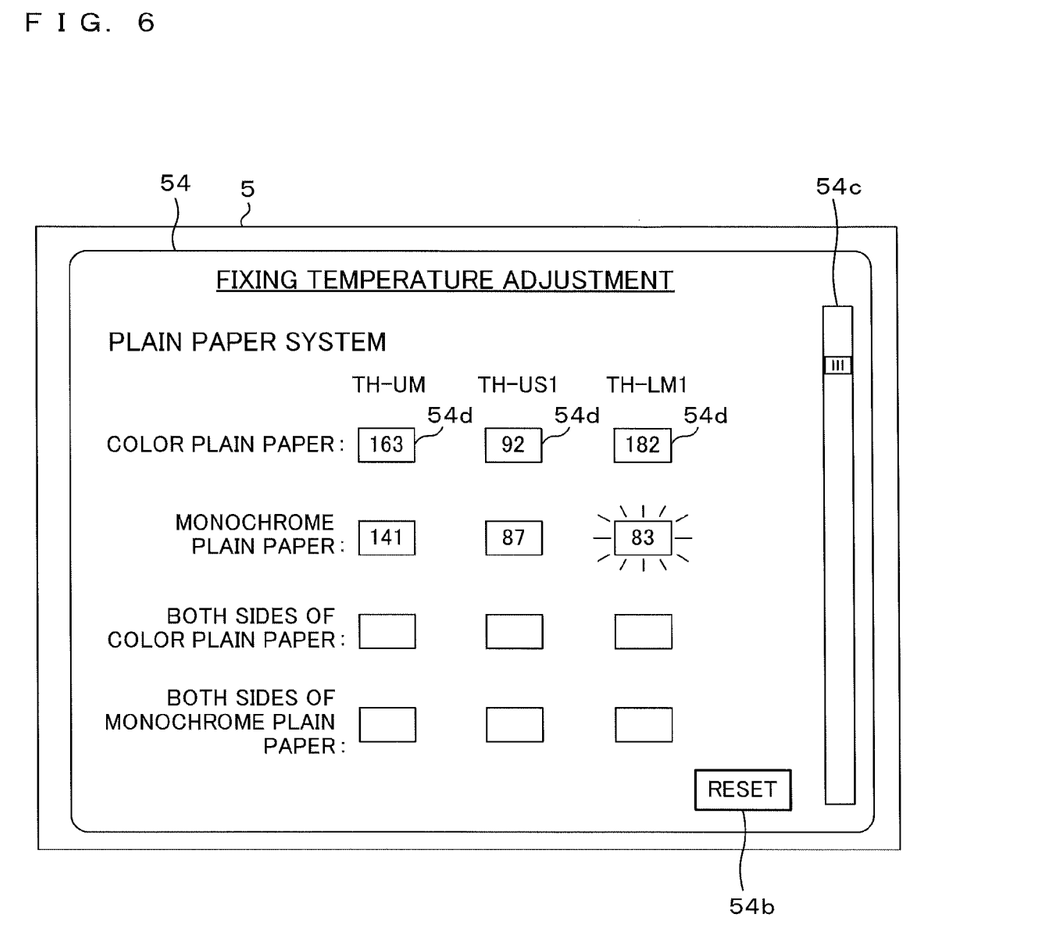
FIG. 6 is an exemplified view illustrating an example of a detailed operation screen displayed on the display unit in the multi-function peripheral according to Embodiment 2 of the present invention.

FIG. 5 is an exemplified view illustrating an example of the simple operation screen displayed on the display unit 5 in the multi-function peripheral 100 according to Embodiment 2 of the present invention, and FIG. 6 is an exemplified view illustrating an example of a detailed operation screen displayed on the display unit 5 in the multi-function peripheral 100 according to Embodiment 2 of the present invention.

In an example of an simple operation screen 53 illustrated in FIG. 5, for the "TH-UM", the "TH-US1", and the "TH-LM1" in adjusting the fixing temperature, as described above, the case of receiving the input of the values having the interval equal to or more than the prescribed threshold value is illustrated.

In the simple operation screen 53, for example, a plain paper system is additionally divided into items of color plain paper, monochrome plain paper, both sides of the color plain paper, and both sides of the monochrome plain paper and the simple operation screen 53 receives the values of the "TH-UM", the "TH-US1", and the "TH-LM1" for the items, respectively, from the user.

In detail, the simple operation screen 53 includes number increasing-decreasing keys 53*a*, 53*a*, . . . (instruction reception section) for receiving an instruction to display values increased or decreased at an interval of "5", a reset key 53*b* for resetting the displayed values, a scroll bar 53*c* for moving to another page, and input frames 53*d*, 53*d*, . . . , in which the values (numbers) to be input are displayed. The user may select, for example, the input frame 53*d* of prescribed items and appropriately operate any one of the number increasing-decreasing keys 53*a* to display the desired values in the input frame 53*d*. Thus the value maybe input.

Since an operator need not perform the detailed operation in the above-described simple operation screen 53, a confusion of the operator in adjustment of the parameters may be prevented so as to improve the operability.

Meanwhile, when the plurality of parameters relating to the function at the time of adjusting the prescribed function are present and there is a need to adjust the parameters, the detailed operation screen 54 may receive the input of the values having the interval narrower than the threshold value relating to the simple operation screen 53 illustrated in FIG. 5. In more detail, in the multi-function peripheral 100 according to Embodiment 2 of the present invention, the detailed operation screen 54 may allow the user to directly input the parameter values using the numeric pad (number reception section) of the operation panel 10. Thereby, at the time of adjusting the parameters, a detailed adjustment may be achieved.

In the example of the detailed operation screen 54 as illustrated in FIG. 6, in adjusting the fixing temperature, for the "TH-UM", the "TH-US1", and the "TH-LM1", the input the more detailed values than the simple operation screen 53 is illustrated. As similar to the case of FIG. 5, the plain paper system is divided into items of color plain paper, monochrome plain paper, both sides of the color plain paper, and both sides of the monochrome plain paper.

In detail, the detailed operation screen 54 includes input frames 54d, 54d, . . . , in which the values (numbers) to be input from the user through the operation panel 10 (numeric pad) are displayed, a reset key 54b for resetting the displayed values, and a scroll bar 54c for moving to another page. For example, the user may select, for example, the input frame 54d of prescribed items and appropriately operate the numeric pad of the operation panel 10 to write the desired values in the input frame 54. Thus the value maybe input. As described above, the user may freely input any number through the numeric pad of the operation panel 10, and therefore it is possible to input the more detailed values the detailed operation screen 54 than the simple operation screen 53.

The he components having functions common to Embodiment 1 are denoted by the same reference numerals, and therefore will not be described in detail.

Embodiment 3

Even in the multi-function peripheral 100 according to Embodiment 3 of the present invention, similar to Embodiment 1, in adjusting the parameters, the simple operation screen and the detailed operation screen having different degrees of detail for received instructions are displayed on the display unit 5.

However, in the multi-function peripheral 100 according to Embodiment 3 of the present invention, the configuration of the simple operation screen is different from those of Embodiments 1 and 2. In detail, the simple operation screen according to Embodiment 3 is configured to allow the user to select any one of the plurality of predetermined values so having prescribed interval.

Figure 7:
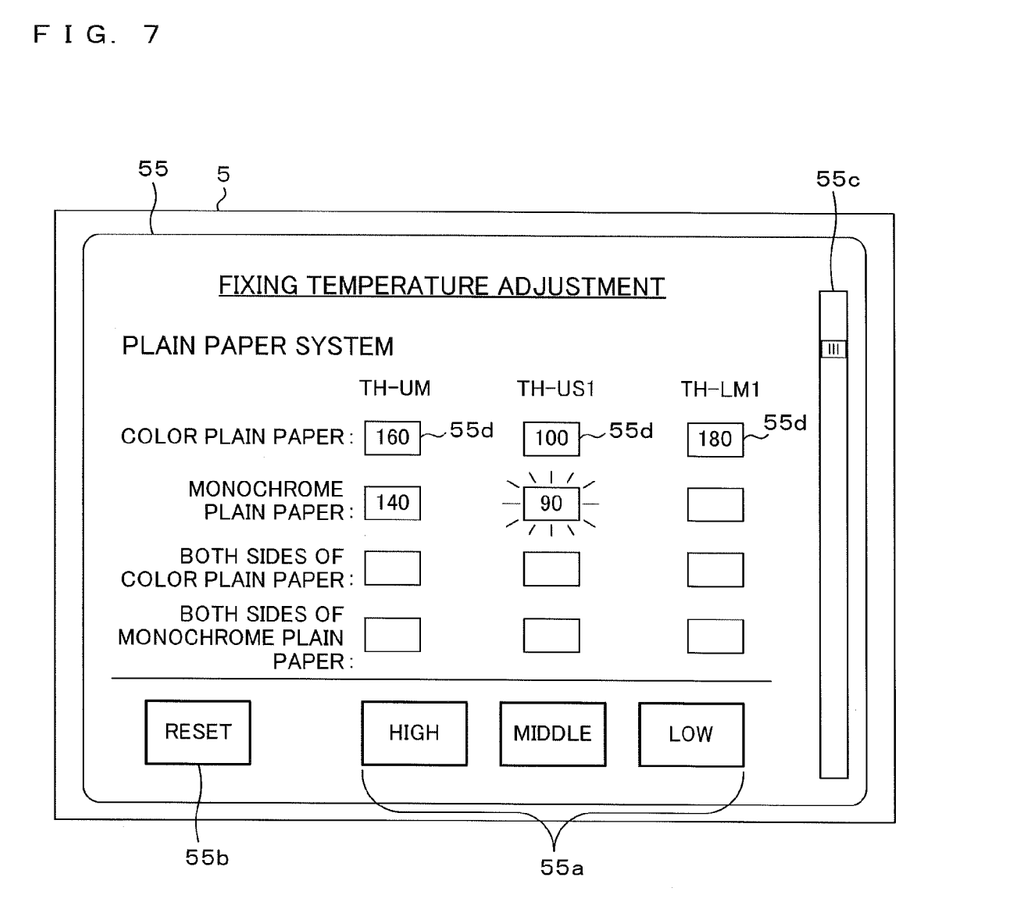
FIG. 7 is an exemplified view illustrating an example of a simple operation screen displayed on a display unit in the multi-function peripheral according to Embodiment 3 of the present invention.

FIG. 7 is an exemplified view illustrating an example of the simple operation screen displayed on the display unit 5 in the multi-function peripheral 100 according to Embodiment 3 of the present invention.

In an example of a simple operation screen 55 illustrated in FIG. 7, for the "TH-UM", the "TH-US1", and the "TH-LM1" of each item in adjusting the fixing temperature, as described above, the case in which any one of the plurality of predetermined values is input is illustrated.

The simple operation screen 55 includes input frames 55d, 55d, . . . , in which the values (numbers) to be input are displayed, a reset key 55b for resetting the displayed values, and a scroll bar 55c for moving to another page.

Further, the simple operation screen 55 is provided with number selecting keys 55a, 55a, . . . (selection reception section) which receive a selection of any one of the plurality of values as value to be displayed in the prescribed input frame 55d from the user and correspond to the plurality of predetermined values respectively. That is, as the number selecting key 55a, a "high" key, a "middle" key, and a "low" key are installed and numbers corresponding to each of these keys are pre-stored in a parameter value table of the storage unit 4. Therefore, when any one of the keys is operated (selected) by the user, a number corresponding to the operated number selecting key 55a is displayed in the input frame 55d.

Figure 8:
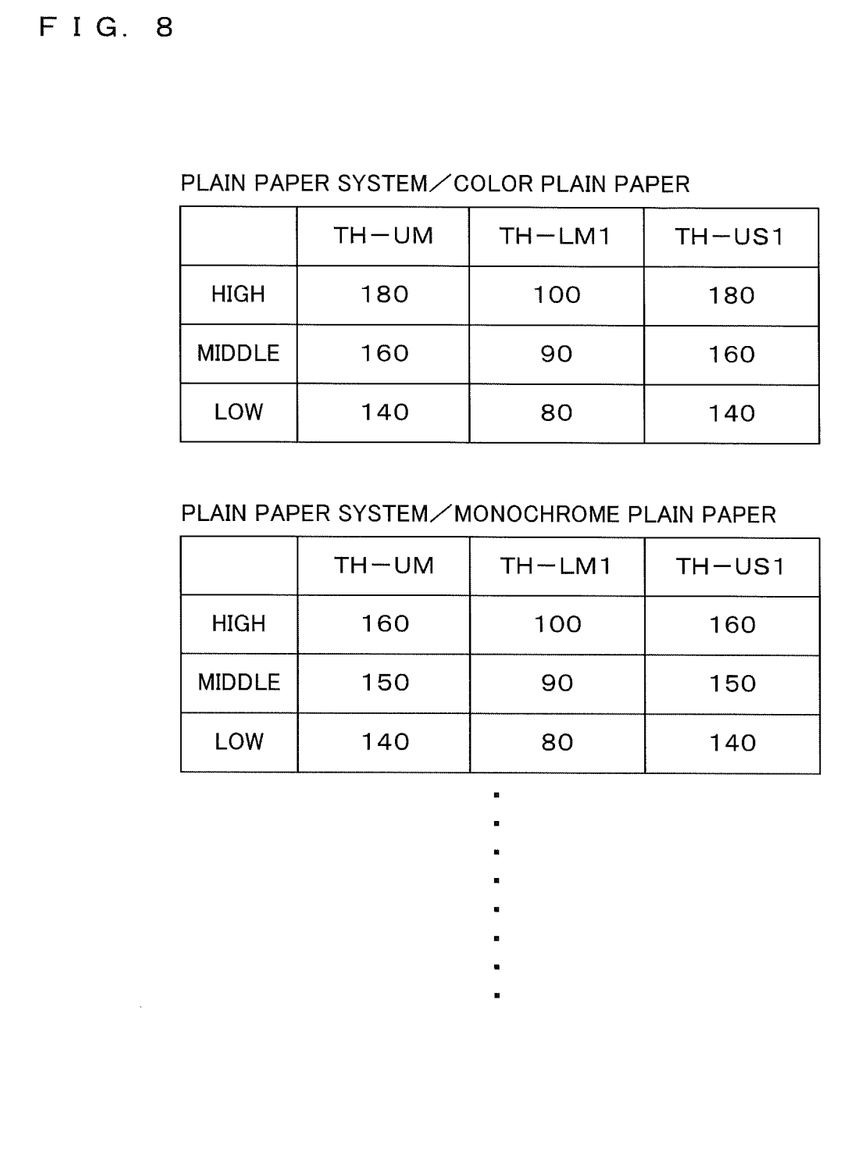
FIG. 8 is a diagram conceptually describing a parameter value table stored in a storage unit in the multi-function peripheral according to Embodiment 3 of the present invention.

The parameter value table is stored in the storage unit 4 of the multi-function peripheral 100 according to Embodiment 3. FIG. 8 is a diagram conceptually describing the parameter value table stored in the storage unit 4 in the multi-function peripheral 100 according to Embodiment 3 of the present invention.

The parameter value table is stored with the plurality of predetermined values having a prescribed interval as the values to be displayed in the prescribed input frame 55d, corresponding to the "high" key, the "middle" key, and the "low" key (number selecting key 55a) displayed on the simple operation screen 55 of FIG. 7. That is, for the "TH-UM", the "TH-US1", and the "TH-LM1" of each item, the values having the prescribed interval for each of the "high" key, the "middle" key, and the "low" key are stored.

Therefore, when the user selects the input frame 55d of the prescribed items and selects (operates) any one of the "high" key, the "middle" key, and the "low" key, values of the parameter value table corresponding to selected soft key is displayed in the input frame 55d and the parameter is adjusted based on the displayed value.

Since an operator need not perform the detailed operation in the above-described simple operation screen 55, a confusion of the operator in adjustment of the parameters may be prevented so as to improve the operability.

The components having functions common to Embodiment 1 are denoted by the same reference numerals, and therefore will not be described in detail.

In the foregoing description, two operation screens such as the detailed operation screen and the simple operation screen as the plurality of reception screens having different degrees of detail for received instructions are described by way of example, but the present invention is not limited thereto, and therefore the reception screens may be configured to include three or more.

Further, the case of the combination of the simple operation screen 51 and the detailed operation screen 52, and the case of the combination of the simple operation screen 53 and the detailed operation screen 54 are described above, but the present invention is not limited thereto. For example, the combinations such as the simple operation screen 51 and the detailed operation screen 54, the simple operation screen 53 and the detailed operation screen 52, the simple operation screen 55 and the detailed operation screen 52, and the like may be changed.

The invention claimed is:

1. An electric equipment having a function in which parameter is set, comprising:
   a display unit configured to display a plurality of reception screens having different degrees of detail for received instructions for adjusting the parameter, the plurality of reception screens receiving input of parameter values at the time of receiving the instruction;
   a large gap input reception screen configured to receive an input of values having an interval equal to or more than a threshold value;
   a small gap input reception screen configured to receive an input of values having an interval narrower than the threshold value; and
   a number reception section configured to receive an input of number,
   wherein the small gap input reception screen receives the input of the parameter values through the number reception section, and the large gap input reception screen comprises an instruction reception section configured to receive an instruction for displaying the values having the interval equal to or more than the threshold value in an ascending order or a descending order, and receives the input of the parameter values based on the value displayed according to the instruction received by the instruction reception section.

2. The electric equipment according to claim 1, comprising a storage unit configured to store a plurality of values having a prescribed interval, wherein the large gap input reception screen comprises selection reception section configured to receive a selection from a user corresponding to each of the plurality of values, and, when any one of the selection reception section is selected, adjusts the parameter based on a value corresponding to the selected selection reception section.

3. The electric equipment according to claim 1, comprising a reception section configured to receive user identification data, wherein the display unit displays any one of the reception screens based on the user identification data received by the reception section.

\* \* \* \* \*